United States Patent
Bai

(10) Patent No.: US 11,301,965 B2
(45) Date of Patent: Apr. 12, 2022

(54) METHOD AND IMAGE PROCESSING DEVICE FOR IMAGE SUPER RESOLUTION, IMAGE ENHANCEMENT, AND CONVOLUTIONAL NEURAL NETWORK MODEL TRAINING

(71) Applicant: Novatek Microelectronics Corp., Hsinchu (TW)

(72) Inventor: Yu Bai, Shaanxi (CN)

(73) Assignee: Novatek Microelectronics Corp., Hsinchu (TW)

( * ) Notice: Subject to any disclaimer, the term of this patent is extended or adjusted under 35 U.S.C. 154(b) by 190 days.

(21) Appl. No.: 16/708,300

(22) Filed: Dec. 9, 2019

(65) Prior Publication Data
US 2021/0065337 A1  Mar. 4, 2021

(30) Foreign Application Priority Data
Sep. 3, 2019 (CN) .......................... 201910826520.0

(51) Int. Cl.
*G06K 9/00* (2006.01)
*G06T 5/00* (2006.01)
*G06T 3/40* (2006.01)
*G06K 9/62* (2022.01)

(52) U.S. Cl.
CPC ............ *G06T 5/003* (2013.01); *G06K 9/6232* (2013.01); *G06K 9/6257* (2013.01); *G06T 3/4053* (2013.01); *G06T 5/007* (2013.01); *G06T 2207/20081* (2013.01); *G06T 2207/20084* (2013.01)

(58) Field of Classification Search
CPC ....... G06T 5/003; G06T 5/007; G06T 3/4053; G06T 2207/20081; G06T 2207/20084; G06T 3/4046; G06T 7/11; G06K 9/6232; G06K 9/6257; G06K 9/6267; G06N 3/0454; G06N 3/08
USPC ........................................................ 382/254
See application file for complete search history.

(56) References Cited

U.S. PATENT DOCUMENTS 10,109,052 B2 * 10/2018 Chefd'hotel .......... G06T 7/0012

OTHER PUBLICATIONS

Ren, Peng, et al. "Clustering-oriented multiple convolutional neural networks for single image super-resolution." Cognitive Computation 10.1 (2018): 165-178. (Year: 2018).*
Dong, Chao, et al. "Image super-resolution using deep convolutional networks." IEEE transactions on pattern analysis and machine intelligence 38.2 (2015): 295-307. (Year: 2015).*

(Continued)

*Primary Examiner* — Jonathan S Lee
(74) *Attorney, Agent, or Firm* — JCIPRNET

(57) ABSTRACT

The disclosure provides methods and image processing devices for image super resolution, image enhancement, and convolutional neural network (CNN) model training. The method for image super resolution includes the following steps. An original image is received, and a feature map is extracted from the original image. The original image is segmented into original patches. Each of the original patches is classified respectively into one of patch clusters according to the feature map. The original patches are processed respectively by different pre-trained CNN models according to the belonging patch clusters to obtain predicted patches. A predicted image is generated based on the predicted patches.

20 Claims, 8 Drawing Sheets

(56) References Cited

OTHER PUBLICATIONS

Chen, Yang, et al. "Multilevel cloud detection for high-resolution remote sensing imagery using multiple convolutional neural networks." ISPRS International Journal of Geo-Information 7.5 (2018): 181. (Year: 2018).*

Hamouda, Maissa, Karim Saheb Ettabaa, and Med Salim Bouhlel. "Modified convolutional neural network based on adaptive patch extraction for hyperspectral image classification." 2018 IEEE International Conference on Fuzzy Systems (FUZZ-IEEE). IEEE, 2018. (Year: 2018).*

* cited by examiner

METHOD AND IMAGE PROCESSING DEVICE FOR IMAGE SUPER RESOLUTION, IMAGE ENHANCEMENT, AND CONVOLUTIONAL NEURAL NETWORK MODEL TRAINING

CROSS-REFERENCE TO RELATED APPLICATION

This application claims the priority benefit of China application serial no. 201910826520.0, filed on Sep. 3, 2019. The entirety of the above-mentioned patent application is hereby incorporated by reference herein and made a part of this specification.

TECHNICAL FIELD

The disclosure relates to methods and image processing devices for image super resolution, image enhancement, and convolutional neural network (CNN) model training.

BACKGROUND

Single image super resolution (SISR) is an inverse problem which aims at storing high frequencies details of an image lost from down-sampling. SISR has received tremendous attention in academia and industry. Recently, learning-based methods have shown great potential.

SUMMARY OF THE DISCLOSURE

Methods and image processing devices for image super resolution, image enhancement, and CNN model training are proposed.

According to one of the exemplary embodiments, the method for image super resolution includes the following steps. An original image is received, and a feature map is extracted from the original image. The original image is segmented into original patches. Each of the original patches is classified respectively into one of patch clusters according to the feature map. The original patches are processed respectively by different pre-trained CNN models according to the belonging patch clusters to obtain predicted patches. A predicted image is generated based on the predicted patches.

According to one of the exemplary embodiments, the method for CNN model training includes the following steps. High-resolution training images are received and down-sampled to generate low-resolution training images respectively corresponding to the high-resolution training images. Feature maps are extracted from the low-resolution training image. Each of the low-resolution training images and the high-resolution training images is segmented respectively into low-resolution training patches and high-resolution training patches. Each of the low-resolution and high-resolution patch pairs is classified respectively into one of patch clusters according to the feature maps. A mapping function of each of CNN models is learned by using all of the low-resolution and high-resolution patch pairs of the patch clusters to generate the corresponding CNN model.

According to one of the exemplary embodiments, the method for image enhancement includes the following steps. An original image is received and segmented into original patches. The original patches are processed respectively by different pre-trained CNN models based on feature information corresponding to the original patches to obtain a plurality of enhanced patches. An enhanced image is generated based on the enhanced patches.

According to one of the exemplary embodiments, the method for CNN model training includes the following steps. High-quality training images are received and downgraded to generate low-quality training image respectively corresponding to the high-quality training images. Each of the low-quality training images and the high-quality training images is segmented respectively into low-quality training patches and high-quality training patches. A mapping function of each CNN model is learned by using the low-quality training patches and the high-quality training patches to generate a corresponding pre-trained CNN model.

According to one of the exemplary embodiments, the image processing device includes a memory circuit and a processing circuit. The memory circuit is configured to store data and pre-trained CNN models. The processing circuit is configured to receive an original image, extract a feature map from the original image, segment the original image into original patches, classify each of the original patches respectively into one of patch clusters according to the feature map, process the original patches respectively by the different pre-trained CNN models according to the belonging patch clusters to obtain predicted patches, and generate the predicted image based on the predicted patches.

According to one of the exemplary embodiments, the image processing device includes a memory circuit and a processing circuit. The memory circuit is configured to store data. The processing circuit is configured to receive high-resolution training images, down-sample the high-resolution training images to generate low-resolution training images respectively corresponding to the high-resolution training images, extract feature maps from the low-resolution training image, segment each of the low-resolution training images and the high-resolution training images respectively into low-resolution training patches and high-resolution training patches, classify each of the low-resolution and high-resolution patch pairs respectively into one of patch clusters according to the feature maps, and learn a mapping function of each CNN model by using all of the low-resolution and high-resolution patch pairs of the patch clusters to generate a corresponding pre-trained CNN model.

According to one of the exemplary embodiments, the image processing device includes a memory circuit and a processing circuit. The memory circuit is configured to store data and pre-trained CNN models. The processing circuit is configured to receive an original image, segment the original image into original patches, process the original patches respectively by the different pre-trained CNN models based on feature information corresponding to the original patches to obtain enhanced patches, and generate an enhanced image based on the enhanced patches.

According to one of the exemplary embodiments, the image processing device includes a memory circuit and a processing circuit. The memory circuit is configured to store data. The processing circuit is configured to receive high-quality training images, downgrade the high-quality training images to generate low-quality training image respectively corresponding to the high-quality training images, segment each of the low-quality training images and the high-quality training images respectively into low-quality training patches and high-quality training patches, and learn a mapping function of each CNN model by using the low-quality training patches and the high-quality training patches to generate a corresponding pre-trained CNN model.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
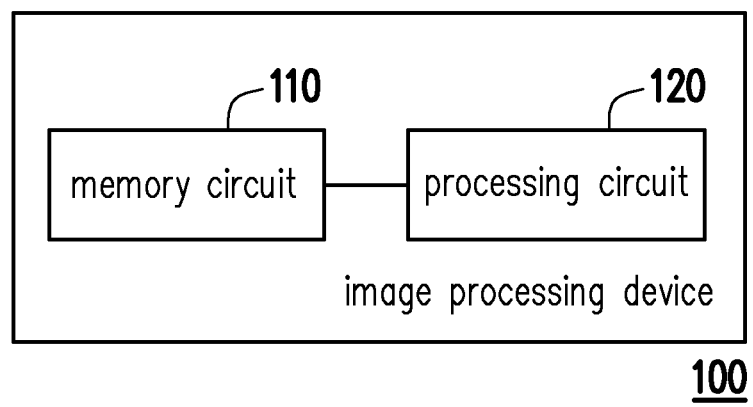
FIG. 1 illustrates a schematic diagram of a proposed image processing device in accordance with one of the exemplary embodiments of the disclosure.

To make the above features and advantages of the application more comprehensible, several embodiments accompanied with drawings are described in detail as follows.

DESCRIPTION OF THE EMBODIMENTS

The target of learning-based super resolution method is to learn a mapping function from low resolution to high resolution via external datasets. Such an approach consists of a training phase and a predicting phase. In the training phase, a low-resolution image and ground-truth high resolution patches are sent to a learning kernel to determine the mapping model. In the predicting phase, a pre-trained mapping model is applied on low-resolution images to estimate high-resolution images, which are referred to as predicted high-resolution images. Such an approach has rapid developments for several years, ranging from linear regression to CNN.

The linear regression-based method is a low-level learning method which can construct a 2D filter as a mapping function such as Eq.(1):

$$Y = W_1 \times X_1 + W_2 \times X_2 + W_3 \times X_3 + \ldots + W_n \times X_n \quad \text{Eq.(1)}$$

where Y denotes a high-resolution pixel, $X_{1 \sim n}$ denote low-resolution pixels within a patch, $W_{1 \sim n}$ denote weights of the 2D filter.

In the training phase, patches with both low resolution and high resolution are divided into clusters according to hard-crafted features extracted from the low-resolution patches. Herein, each cluster corresponds to a unique 2D filter, which is determined by solving Eq.(1) or its variants. In the predicting phase, the 2D filters are applied according to a low-resolution feature map.

The linear regression-based method performs decently on edge reconstruction, and yet detail restoration on super resolution with a large scaling ratio is not able to be resolved. Due to the limitation of a 2D filter, it can only represent a linear relationship between low-resolution patches and high-resolution patches. Furthermore, the mean square error (MSE) objective function of linear regression or its like causes blurry or overly-smoothed results that are perceptually unsatisfying due to insufficient high-frequency details.

On the other hand, the CNN-based method learns an end-to-end mapping model between low-resolution and high-resolution images, generally understood as feature extraction, non-linear mapping and reconstruction. Each function block consists of one or several convolution layers and contains multiple filters.

In the training phase, low-resolution patches are fed into a forward network, and predicted high-resolution patches are outputted. A comparison block, known as a loss layer, evaluates the errors between the predicted high-resolution patches and target patches, and then the errors are fed back to the network to update its filters (e.g. weights of the filters). After a significant amount of forward and backward iterations, the error would drop into a global minimum. This means that the weights of the filters have been well-trained. In the predicting phase, following the forward network processing, the predicted high-resolution image would be restored from the low-resolution image.

Configured by cascade convolution layers, the CNN architecture is suitable to fit a complex non-linear relationship in ill-pose problem. Recently, a new perceptual loss function has been introduced in CNN-based super resolution and has performed significantly better than MSE especially in high frequency details.

However, the CNN architecture was introduced in computer vision field to solve high-wise problem such as handwriting recognition and face recognition since it can easily extract and classify high-level features. On the other hand, image super resolution is a low-wise problem and more concerns about low-level features. There exists an astronomical amount of types of low-level features in training datasets such as varieties of noises, textures, and edges. This would take massive filters to learn to extract and restore such features, where many invalid or similar filters may exist in layers. Meanwhile, outputting different types of feature patches for training leads to a trade-off status such as more texture samples, worse edge performance, and so forth.

To resolve the aforesaid issues, some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed image processing device in accordance with one of the exemplary embodiments of the disclosure. All components of the image processing device and their configurations are first introduced in FIG. 1. The functionalities of the components are disclosed in more detail in conjunction with FIG. 2.

Referring to FIG. 1, an image processing device 100 would include a memory circuit 110 and a processing circuit 120 coupled thereto in the present exemplary embodiment. The image processing device 100 may be implemented as an integrated circuit (IC) or a computer system. The memory circuit 110 would be configured to store programming codes, device configurations, data, and so forth and may be implemented using any memory technology. The processing circuit 120 would be configured to implement functional elements of the proposed method in the following exemplary embodiments.

The capability of non-linear relationship description in a CNN architecture is an advanced version compared with linear regression, where such architecture mainly reflects in cascade filtering and flexible objective functions. On the other hand, the efficient and mature feature extraction and separation in linear regression would assist the CNN architecture to reduce redundancy and focus on solving specific restoration problems. In the following embodiments, a method for cluster-specific CNN-based image super resolution and a method for CNN model training, which combine handcrafted feature extraction with CNN super resolution processing, are presented.

Figure 2:
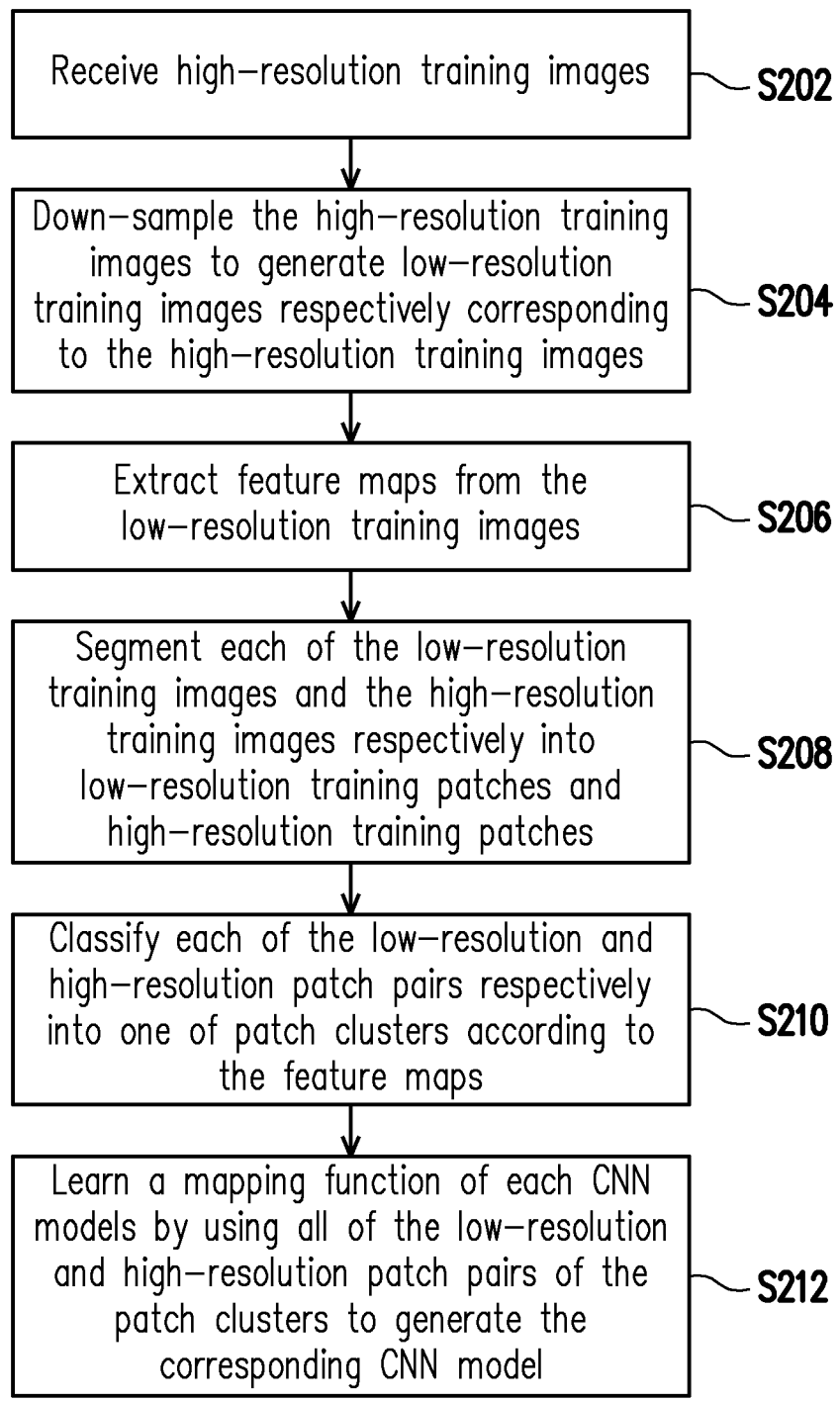
FIG. 2 illustrates a flowchart of a proposed method for CNN model training in accordance with one of the exemplary embodiments of the disclosure.

First, FIG. 2 illustrates a flowchart of a proposed method for CNN model training in accordance with one of the exemplary embodiments of the disclosure. The steps of FIG. 2 could be implemented by the proposed image processing device 100 as illustrated in FIG. 1.

Referring to FIG. 2 in conjunction to FIG. 1, the processing circuit 120 of the image processing device 100 would receive high-resolution training images (Step S202) and down-sample the high-resolution training images to generate low-resolution training images respectively corresponding to the high-resolution training images (Step S204). Herein, the high-resolution training images would be ground-truth pictures with high resolution, and the low-resolution training image would be obtained by down-sampling the high-resolution images through any existing down-sampling algorithm as known per se.

Next, the processing circuit 120 would extract feature maps from the low-resolution training images (Step S206) by applying a feature extractor thereon, where the feature maps would represent feature information respectively corresponding to the low-resolution training images. The feature extractor may be a handcrafted feature extractor such as a binary adaptive dynamic range coder (ADRC), an edge detector, and so forth. The processing circuit 120 would then segment each of the low-resolution training images and the high-resolution training images respectively into low-resolution training patches and high-resolution training patches (Step S208) according to the feature maps.

The processing circuit 120 would classify each of the low-resolution and high-resolution patch pairs respectively into one of patch clusters according to the feature maps (Step S210), where each of the patch clusters corresponds to a unique CNN and is trained separately. That is, processing circuit 120 would learn a mapping function of each CNN model by using all of the low-resolution and high-resolution patch pairs of the patch clusters to generate the corresponding CNN model (Step S212). Note that each of the CNN models would include multiple convolution layers and an upscaling layer. The number of the convolution layers of each of the CNN models may be the same or different, and the upscaling layer in each of the CNN models may upscale an output of one of the convolution layers to a target resolution. After the learning process completes, the generated CNN models would be considered as pre-trained CNN models and ready for use.

Figure 3:
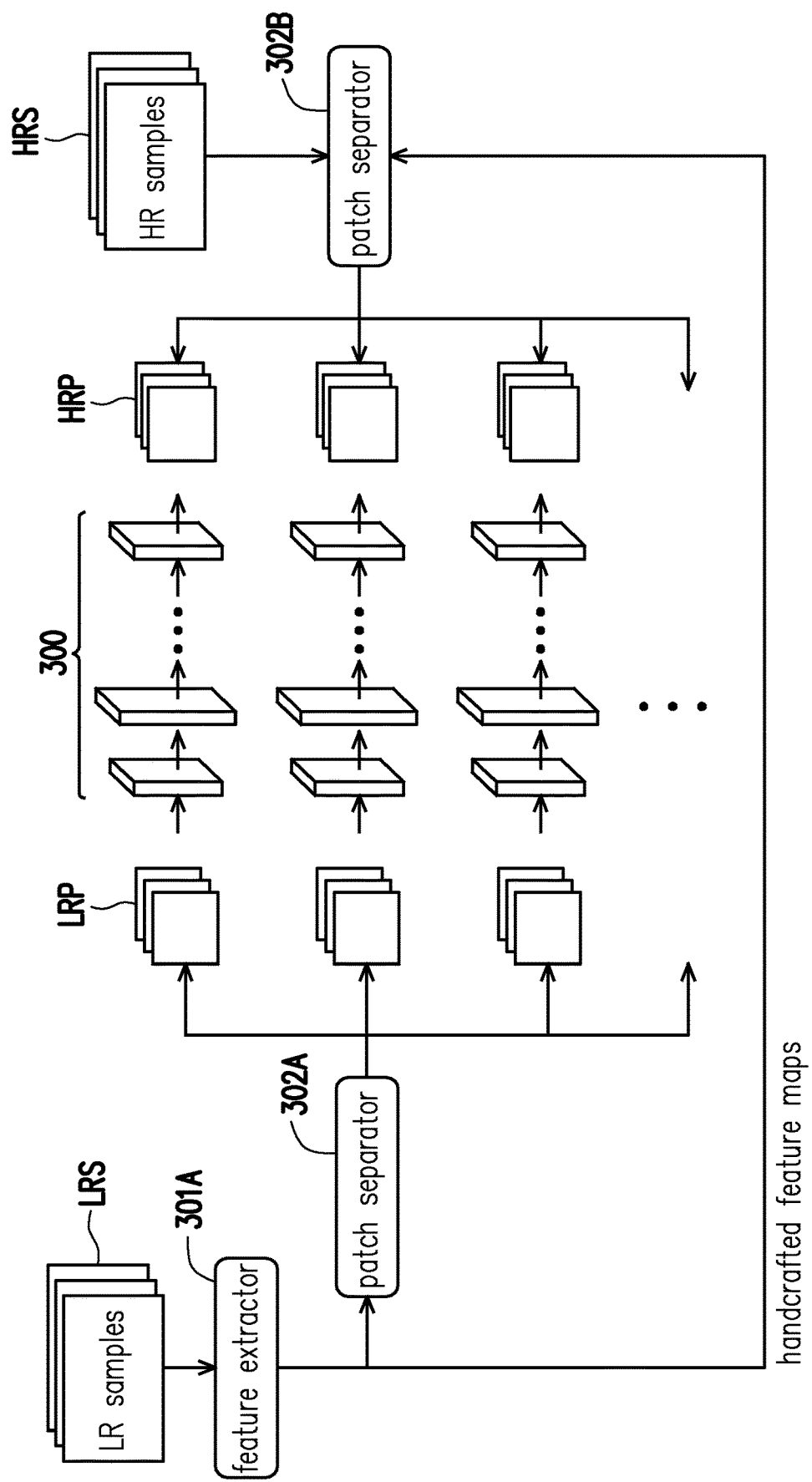
FIG. 3 illustrates a functional diagram of a proposed method for CNN model training in accordance with one of the exemplary embodiments of the disclosure.

For better comprehension, FIG. 3 illustrates a functional diagram of a proposed method for CNN model training in accordance with one of the exemplary embodiments of the disclosure.

Referring to FIG. 3, low-resolution samples LRS and high-resolution samples HRS would be considered as inputs, where the high-resolution samples would be ground-truth images with high resolution and the low-resolution samples LRS would be down-sampled versions of the high-resolution samples HRS. Next, the low-resolution samples LRS and the high-resolution samples HRS would be segmented into low-resolution patches LRP and high-resolution patches HRP and classified into patch clusters by a patch separator 302A and a patch separator 302B respectively. The classification can be performed according to handcrafted feature maps calculated by a feature extractor 301A. Herein, the feature extractor may also be a handcrafted feature extractor such as a binary adaptive dynamic range coder (ADRC), an edge detector, and so forth. For each cluster, a structure-customized CNN model would learn a mapping function from the low-resolution patches LRP and the high-resolution patches HRP. The CNN models 300 are ready for use after inner clusters are trained.

Figure 4:
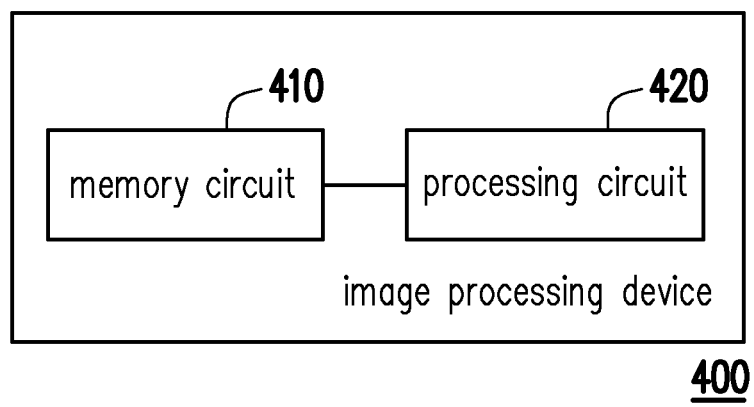
FIG. 4 illustrates a schematic diagram of a proposed image processing device in accordance with one of the exemplary embodiments of the disclosure.

FIG. 4 illustrates a schematic diagram of a proposed image processing device in accordance with one of the exemplary embodiments of the disclosure. All components of the image processing device and their configurations are first introduced in FIG. 4. The functionalities of the components are disclosed in more detail in conjunction with FIG. 5.

Referring to FIG. 4, an image processing device 400 would include a memory circuit 410 and a processing circuit 420 coupled thereto in the present exemplary embodiment. The image processing device 400 may be implemented as an integrated circuit (IC) or a computer system. The memory circuit 410 would be configured to store programming codes, device configurations, data, and so forth and may be implemented using any memory technology. The processing circuit 420 would be configured to implement functional elements of the proposed method in the following exemplary embodiments. It should be noted that, in one exemplary embodiment, the image processing device 400 and the image processing device 100 may be a same device. The disclosure is not limited in this regard.

Figure 5:
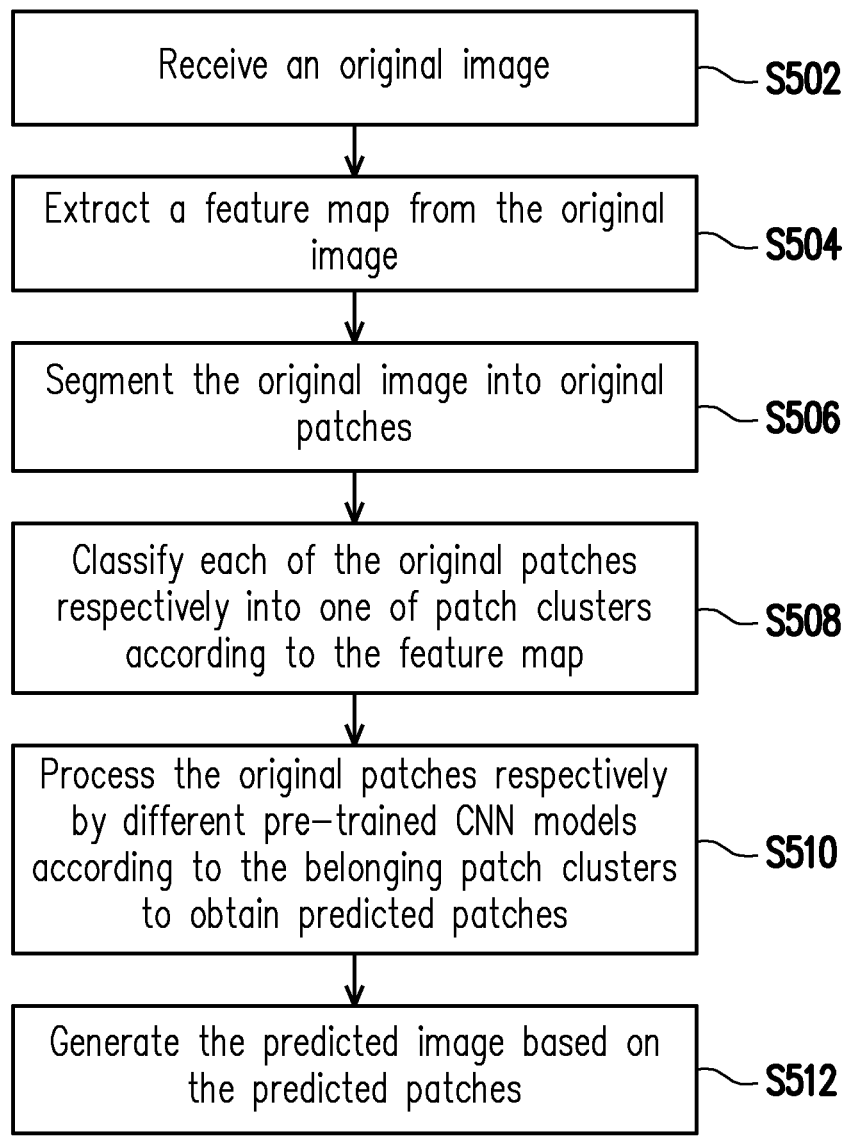
FIG. 5 illustrates a flowchart of a proposed method for image super resolution in accordance with one of the exemplary embodiments of the disclosure.

FIG. 5 illustrates a flowchart of a proposed method for image super resolution in accordance with one of the exemplary embodiments of the disclosure. The steps of FIG. 5 could be implemented by the proposed image processing device 400 as illustrated in FIG. 4. In the present exemplary embodiment, pre-trained CNN models, such as the ones as described in FIG. 2, are prestored in the memory circuit 410.

Referring to FIG. 5 in conjunction to FIG. 4, the processing circuit 420 would receive an original image (Step S502) and extract a feature map from the original image (Step S504). Herein, the processing circuit 420 would apply a feature extractor in a feature space on the original image to generate the feature map, where each pixel in the original image can have at least one feature value at a same coordinate in the feature map. Herein, the feature extractor may also be a handcrafted feature extractor such as a binary adaptive dynamic range coder (ADRC), an edge detector, and so forth.

Next, the processing circuit 420 would segment the original image into original patches (Step S506) according to the feature map and classify each of the original patches respectively into one of patch clusters according to the feature map (Step S508). Assume that the feature value of a patch would be the feature value of its center pixel. The processing circuit 420 would classify original patches with the same feature value into one patch cluster, where each of the clusters corresponds to a different one of the pre-trained CNN models.

Next, the processing circuit 420 would process the original patches respectively by the different pre-trained CNN models according to the belonging patch clusters to obtain predicted patches (Step S510). Herein, the processing circuit 420 would process the original patches respectively by the corresponding pre-trained CNN models to obtain the predicted patches. In the present exemplary embodiment, the processing circuit 420 would upscale the original patches to a target resolution and process the upscaled original patches into the pre-trained CNN models according to which cluster they belong to.

The processing circuit 420 would generate a predicted image based on the predicted patches (Step S512) by, for example, assembling the predicted patches into the predicted image. Note that the resolution of the original patches would be lower than the resolution of the predicted patches, and the resolution of the original image would be lower than the resolution of the predicted image.

Figure 6:
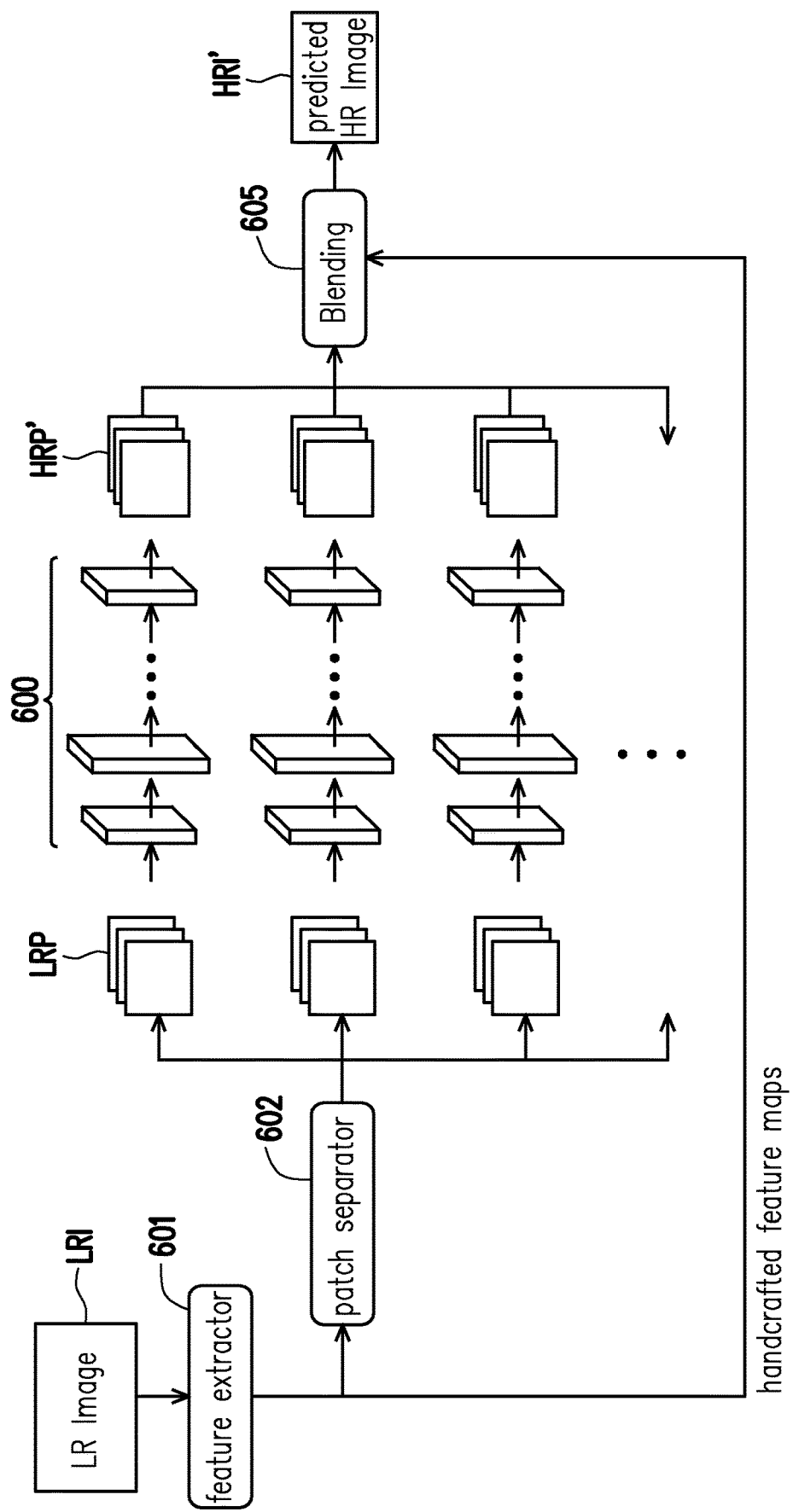
FIG. 6 illustrates a functional diagram of a proposed method for image super resolution in accordance with one of the exemplary embodiments of the disclosure.

For better comprehension, FIG. 6 illustrates a functional diagram of a proposed method for image super resolution in accordance with one of the exemplary embodiments of the disclosure.

Referring to FIG. 6, a low-resolution image LRI would be considered as an input. Next, the low-resolution image LRI would be segmented into low-resolution patches LRP and classified into patch clusters by a patch separator 602 according to a handcrafted feature map calculated by a feature extractor 601. For each cluster, the low-resolution patches LRP are processed by a corresponding CNN model, and a corresponding predicted high-resolution patch HRP' is outputted. A predicted high-resolution image HRI' would be obtained by a blending process 605 in which the predicted high-resolution patches HRP' are blended through any existing image blending algorithm as known per se according to the handcrafted feature map and outputted as a final result.

Based on the above exemplary embodiments, the method for cluster-specific CNN-based image super resolution and the method for CNN model training would combine handcrafted feature extraction with CNN super resolution processing. In the training phase, low-resolution patches would be divided into clusters by referring to feature maps (e.g. handcrafted feature maps), and each of the clusters corresponds to a unique CNN model that is trained separately. In the predicting phase, cluster-specific CNN models would be selected according to a feature map generated based on a low-resolution image. The proposed methods would improve the current architectures in, for example, two aspects. Firstly, low-level feature extraction in CNN would be replaced with an efficient and mature handcrafted feature design technique. Secondly, the whole problem domain and cluster-specific training would be decomposed to learn morphology-specific CNNs, which would be benefit for error regression and efficiency improvement.

Figure 7:
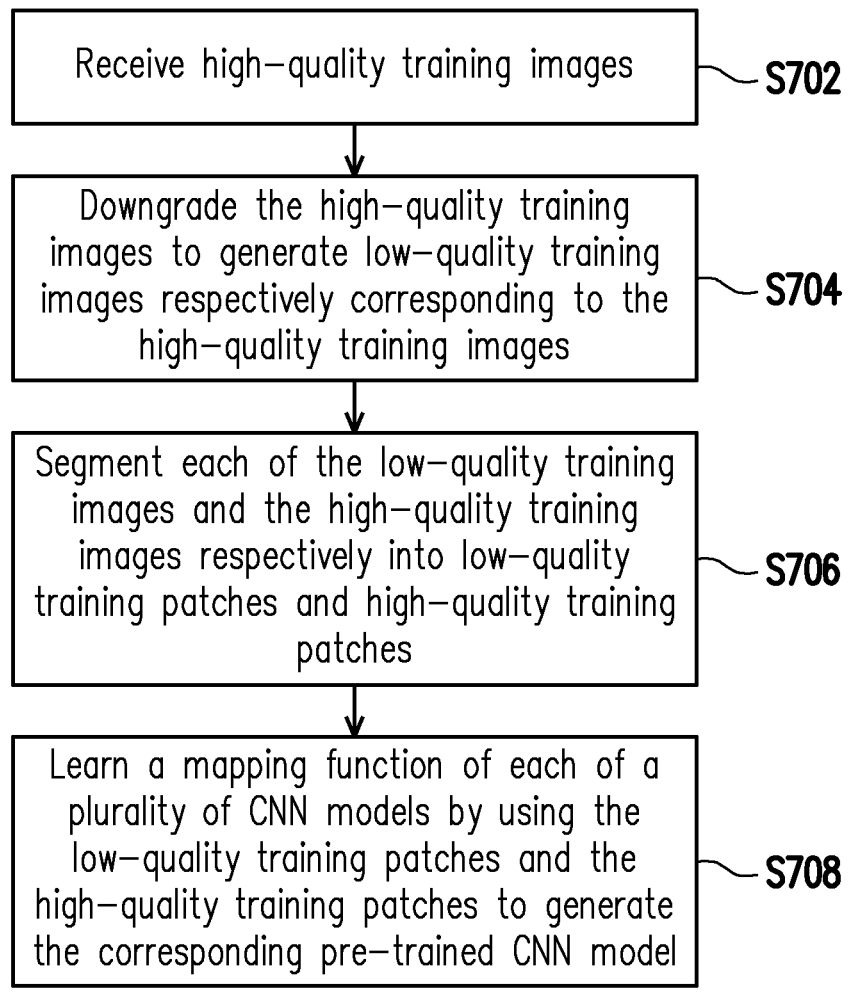
FIG. 7 illustrates a flowchart of a proposed method for CNN model training in accordance with one of the exemplary embodiments of the disclosure.
Figure 8:
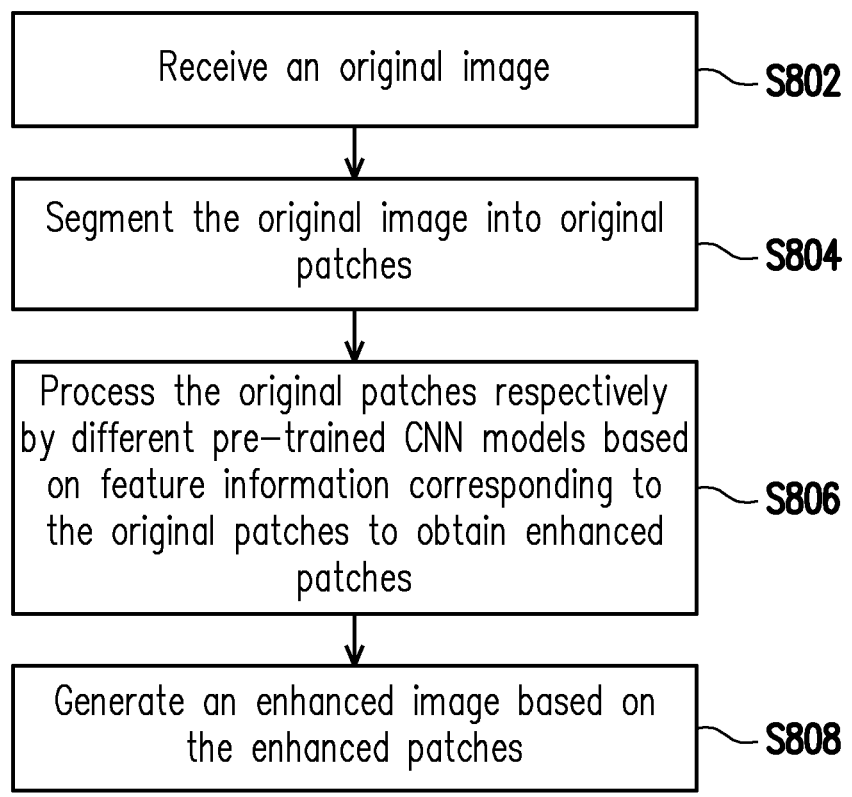
FIG. 8 illustrates a flowchart of a proposed method for image enhancement in accordance with one of the exemplary embodiments of the disclosure.

As a side note, the proposed methods for CNN model training and image super resolution may be extended to another level as illustrated in FIG. 7 and FIG. 8.

FIG. 7 illustrates a flowchart of a proposed method for CNN model training in accordance with one of the exemplary embodiments of the disclosure. The steps of FIG. 7 could be implemented by the proposed image processing device 100 as illustrated in FIG. 1.

Referring to FIG. 7 in conjunction to FIG. 1, the processing circuit 120 of the image processing device 100 would receive high-quality training images (Step S702). Next, the processing circuit 120 would downgrade the high-quality training images to generate low-quality training images respectively corresponding to the high-quality training images (Step S704). The processing circuit 120 would segment each of the low-quality training images and the high-quality training images respectively into low-quality training patches and high-quality training patches (Step S706). The processing circuit 120 would learn a mapping function of each of a plurality of CNN models by using the low-quality training patches and the high-quality training patches to generate the corresponding pre-trained CNN model (Step S708). Note that the main differentiation between FIG. 7 and FIGS. 2-3 is that the high-resolution training images are replaced by high-quality training images as initial inputs, and the low-quality training images are generated by downgrading the high-quality training images. The high-quality training images can be (but not limited to) high-resolution training images. Similarly, the low-quality training images can be (but not limited to) low-resolution training images. The details of Steps S702~S708 may be deduced by the person skilled in the art according to the descriptions of FIGS. 2-3.

FIG. 8 illustrates a flowchart of a proposed method for image enhancement in accordance with one of the exemplary embodiments of the disclosure. The steps of FIG. 8 could be implemented by the proposed image processing device 400 as illustrated in FIG. 1.

Referring to FIG. 8 in conjunction to FIG. 4, the processing circuit 420 of the image processing device 400 would receive an original image (Step S802) and segment the original image into original patches (Step S804). Next, the processing circuit 420 would process the original patches respectively by different pre-trained CNN models based on feature information corresponding to the original patches to obtain enhanced patches (Step S806). The processing circuit 420 would generate an enhanced image based on the enhanced patches (Step S808). Note that the main differentiation between FIG. 8 and FIGS. 5-6 is that the final resultant is an enhanced image generated based on enhanced patches which can be (but not limited to) an image with super resolution. The details of Steps S802~S808 may be deduced by the person skilled in the art according to the descriptions of FIGS. 5-6.

In view of the aforementioned descriptions, the proposed methods and image processing devices for image super resolution, image enhancement, and CNN model training improve the current architectures with an efficient and mature technique that also benefit for error regression and efficiency improvement.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for image super resolution, comprising:
    receiving an original image;
    extracting a feature map from the original image;
    segmenting the original image into a plurality of original patches;
    classifying each of the original patches respectively into one of a plurality of patch clusters according to the feature map;
    processing the original patches respectively by a plurality of different pre-trained convolutional neural network (CNN) models according to the belonging patch clusters to obtain a plurality of predicted patches; and
    generating a predicted image based on the predicted patches.

2. The method according to claim 1, wherein the step of extracting the feature map from the original image comprises:
    applying a feature extractor on the original image, wherein each pixel in the original image has a feature value at a same coordinate in the feature map.

3. The method according to claim 2, wherein the feature value of a center pixel of a patch among the original patches represents the feature value of the patch.

4. The method according to claim 2, wherein the step of classifying each of the original patches respectively into one of the patch clusters according to the feature map comprises:
    classifying original patches with the same feature value into one patch cluster, wherein each of the clusters corresponds to a different one of the pre-trained CNN models.

5. The method according to claim 2, wherein the feature extractor is a binary adaptive dynamic range coder (ADRC).

6. The method according to claim 2, wherein the feature extractor is edge detector.

7. The method according to claim 1, wherein the step of processing the original patches respectively by the different pre-trained CNN models comprises:
    processing the plurality of original patches respectively by the corresponding pre-trained CNN models to obtain the predicted patches.

8. The method according to claim 1, wherein each of the pre-trained CNN models comprises a plurality of convolution layers.

9. The method according to claim 1, wherein the step of processing the original patches respectively by the different pre-trained CNN models according to the belonging patch clusters comprising:
    upscaling the original patches to a target resolution; and
    processing the upscaled original patches into the pre-trained CNN models according to which cluster they belong to.

10. The method according to claim 1, wherein each of the pre-trained CNN models comprises a plurality of convolution layers and an upscaling layer, and wherein the upscaling layer in each of the pre-trained CNN models upscales an output of one of the convolution layers to a target resolution.

11. The method according to claim 1, wherein the step of generating the predicted image based on the predicted patches comprises:
    assembling the predicted patches into the predicted image.

12. The method according to claim 1, wherein a resolution of the original image is lower than a resolution of the predicted image.

13. The method according to claim 1, wherein a resolution of each of the original patches is lower than a resolution of each of the predicted patches.

14. A method for convolutional neural network (CNN) model training, comprising:
    receiving a plurality of high-resolution training images;
    down-sampling the high-resolution training images to generate a plurality of low-resolution training images respectively corresponding to the high-resolution training images;
    extracting feature maps from the low-resolution training image;
    segmenting each of the low-resolution training images and the high-resolution training images respectively into a plurality of low-resolution training patches and a plurality of high-resolution training patches; and
    classifying each of the low-resolution and high-resolution patch pairs respectively into one of a plurality of patch clusters according to the feature maps; and
    learning a mapping function of each of a plurality of CNN models by using all of the low-resolution and high-resolution patch pairs of the patch clusters to generate a corresponding pre-trained CNN model.

15. A method for image enhancement, comprising:
    receiving an original image;
    extracting a feature map from the original image;
    segmenting the original image into a plurality of original patches;
    processing the original patches respectively by a plurality of different pre-trained convolutional neural network (CNN) models based on the feature map corresponding to the original patches to obtain a plurality of enhanced patches; and
    generating an enhanced image based on the enhanced patches.

16. A method for convolutional neural network (CNN) model training, comprising:
    receiving a plurality of high-quality training images;
    downgrading the high-quality training images to generate a plurality of low-quality training image respectively corresponding to the high-quality training images;
    extracting feature maps from the low-quality training images;
    segmenting each of the low-quality training images and the high-quality training images respectively into a plurality of low-quality training patches and a plurality of high-quality training patches; and
    learning a mapping function of each of a plurality of CNN models by using the feature maps, the low-quality training patches, and the high-quality training patches to generate a corresponding pre-trained CNN model.

17. An image processing device comprising:
a memory circuit, configured to store data and a plurality of different pre-trained convolutional neural network (CNN) model; and
a processing circuit, configured to:
receive an original image;
extract a feature map from the original image;
segment the original image into a plurality of original patches;
classify each of the original patches respectively into one of a plurality of patch clusters according to the feature map;
process the original patches respectively by the different pre-trained CNN models according to the belonging patch clusters to obtain a plurality of predicted patches; and
generate the predicted image based on the predicted patches.

18. An image processing device comprising:
a memory circuit, configured to store data; and
a processing circuit, configured to:
receive a plurality of high-resolution training images;
down-sample the high-resolution training images to generate a plurality of low-resolution training images respectively corresponding to the high-resolution training images;
extract feature maps from the low-resolution training image;
segment each of the low-resolution training images and the high-resolution training images respectively into a plurality of low-resolution training patches and a plurality of high-resolution training patches;
classify each of the low-resolution and high-resolution patch pairs respectively into one of a plurality of patch clusters according to the feature maps; and
learn a mapping function of each of a plurality of CNN models by using all of the low-resolution and high-resolution patch pairs of the patch clusters to generate a corresponding pre-trained CNN model.

19. An image processing device comprising:
a memory circuit, configured to store data and a plurality of different pre-trained convolutional neural network (CNN) model; and
a processing circuit, configured to:
receive an original image;
extract a feature map from the original image;
segment the original image into a plurality of original patches;
process the original patches respectively by a plurality of different pre-trained CNN models based on the feature map corresponding to the original patches to obtain a plurality of enhanced patches; and
generate an enhanced image based on the enhanced patches.

20. An image processing device comprising:
a memory circuit, configured to store data; and
a processing circuit, configured to:
receive a plurality of high-quality training images;
downgrade the high-quality training images to generate a plurality of low-quality training image respectively corresponding to the high-quality training images;
extract feature maps from the low-quality training images;
segment each of the low-quality training images and the high-quality training images respectively into a plurality of low-quality training patches and a plurality of high-quality training patches; and
learn a mapping function of each of a plurality of CNN models by using the feature maps, the low-quality training patches, and the high-quality training patches to generate a corresponding pre-trained CNN model.

* * * * *